No. 727,011. PATENTED MAY 5, 1903.
F. P. SMITH.
CREMATORY FOR GARBAGE OR LIKE SUBSTANCES.
APPLICATION FILED DEC. 12, 1899.
NO MODEL. 3 SHEETS—SHEET 1.
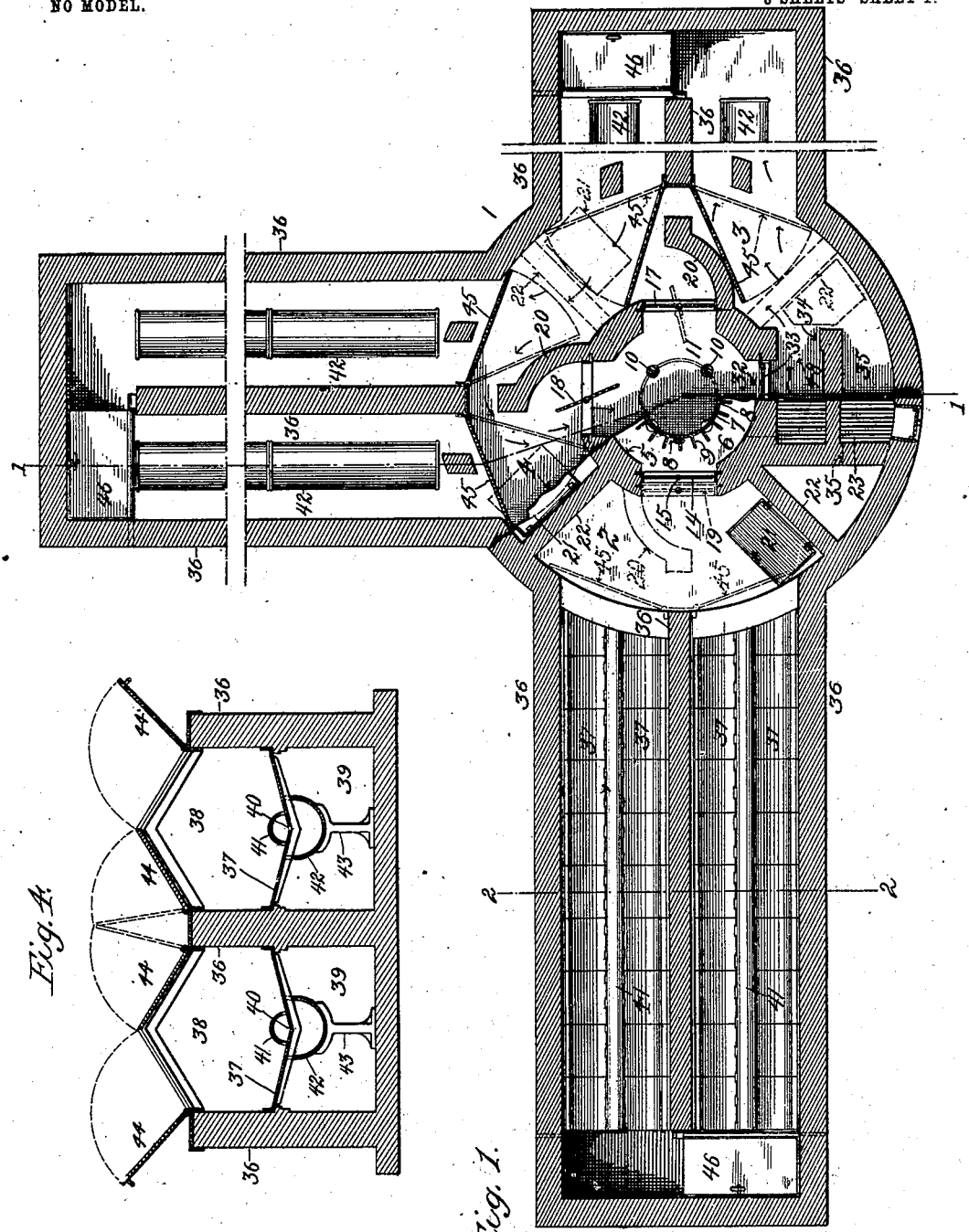
Witnesses
Julia M. Pond
D. E. Purdine
Inventor:
Fred P. Smith,
by Dodge and Sons,
Attorneys.

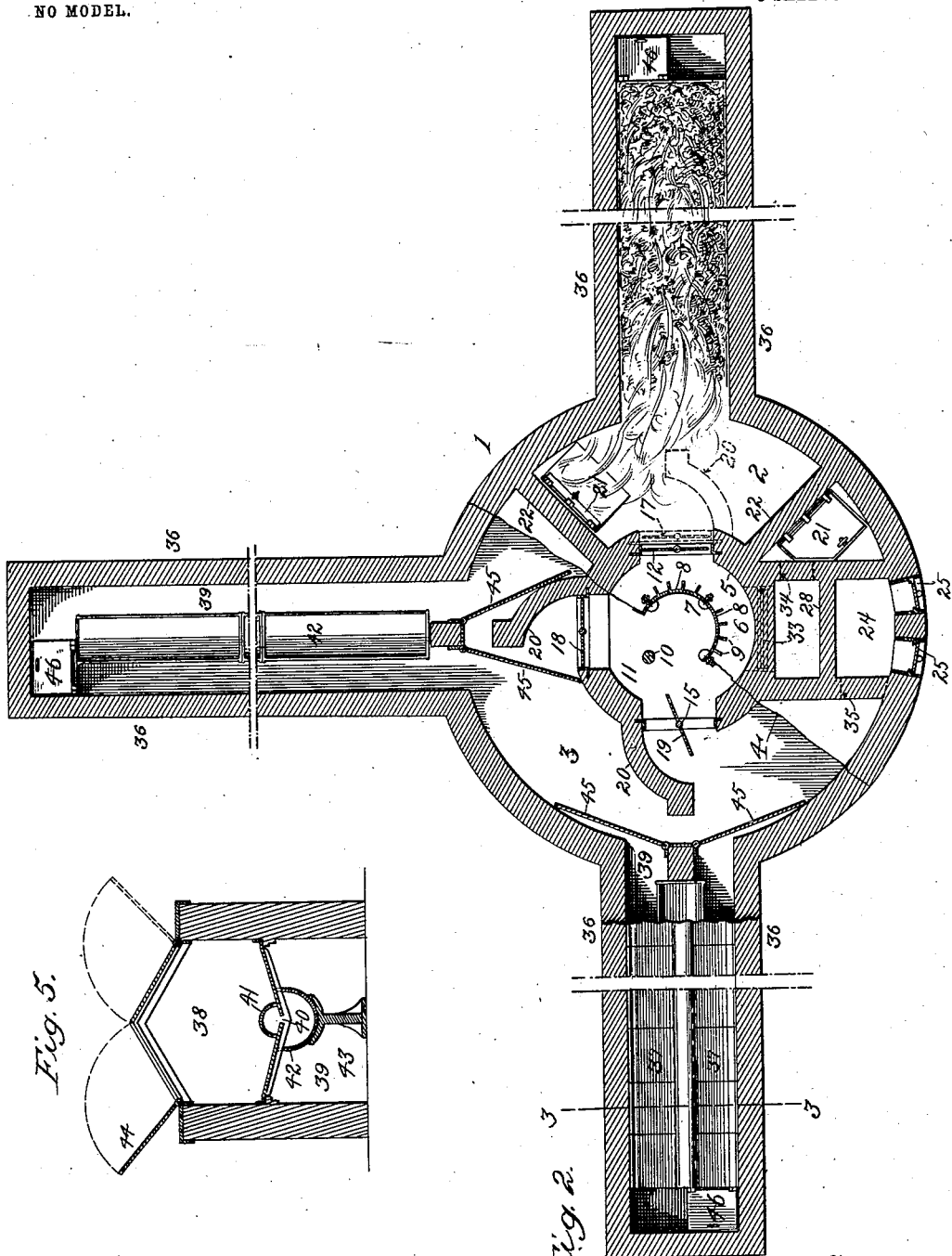

No. 727,011. PATENTED MAY 5, 1903.
F. P. SMITH.
CREMATORY FOR GARBAGE OR LIKE SUBSTANCES.
APPLICATION FILED DEC. 12, 1899.
NO MODEL. 3 SHEETS—SHEET 3.
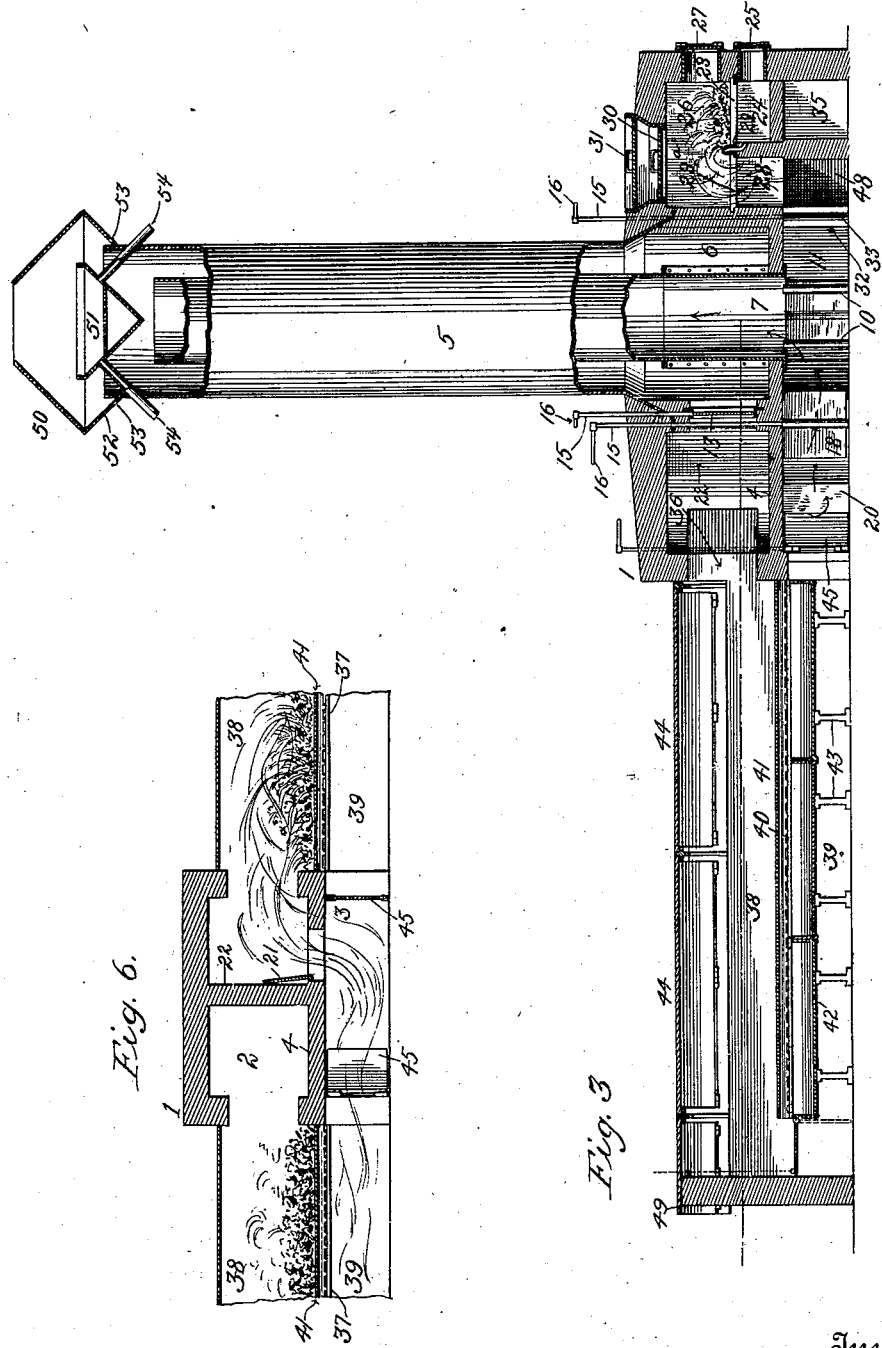
Witnesses
Julia M. Pond.
D. E. Burdine.
Inventor:
Fred P. Smith,
by Dodge
Attorneys.

No. 727,011.

Patented May 5, 1903.

UNITED STATES PATENT OFFICE.

FRED P. SMITH, OF ALBANY, NEW YORK, ASSIGNOR TO THE MUNICIPAL ENGINEERING COMPANY, OF NEW YORK, N. Y., A CORPORATION OF DELAWARE.

CREMATORY FOR GARBAGE OR LIKE SUBSTANCES.

SPECIFICATION forming part of Letters Patent No. 727,011, dated May 5, 1903.

Application filed December 12, 1899. Serial No. 740,070. (No model.)

*To all whom it may concern:*

Be it known that I, FRED P. SMITH, a citizen of the United States, residing at Albany, in the county of Albany and State of New York, have invented certain new and useful Improvements in Crematories for Garbage or Like Substances, of which the following is a specification.

My present invention pertains to improvements in crematories for garbage and the like, the construction and advantages of which will be hereinafter set forth, reference being had to the annexed drawings, wherein—

Figure 1 is a horizontal sectional view, the right-hand portion of the main or central body of said figure being taken upon a plane passing through the lower portion of said main body; Fig. 2, a similar view, the left-hand section of the main or central body showing the lowermost portion thereof; Fig. 3, a vertical sectional view taken on the line 1 1 of Fig. 1; Fig. 4, a transverse vertical sectional view on the line 2 2 of Fig. 1; Fig. 5, a transverse vertical sectional view on the line 3 3 of Fig. 2, and Fig. 6 a diagrammatic sectional view taken through two of the receiving-trunks and a portion of the main or central body.

One object of my invention is to construct a crematory plant for the disposal of garbage and the like and to so arrange the parts thereof that after the apparatus is once started and the initial charge of garbage is dried said charge may be burned or incinerated and the heat therefrom utilized in drying out a second charge, and so on through the series.

The invention has for its further object the arrangement of the garbage receiving and incinerating chambers or trunks in such manner with reference to the main or central body that one or more of the incinerating chambers or trunks may be out of action and entirely cut off from the remainder of the apparatus, so that it may be cleaned out and recharged without affecting the operation of the apparatus as a whole. The advantages of such a construction are manifest and numerous, and will be hereinafter pointed out in detail.

Referring to the drawings, 1 indicates the main or central body of the apparatus, which is divided into horizontally-disposed chambers 2 and 3, which are separated by a floor or wall 4.

Rising from the upper portion of the main body is a stack or flue 5, which is in direct communication with a chamber or compartment 6, formed centrally of the upper chambers 2. Said stack or flue 5 has formed within it a second flue 7, which passes centrally therethrough and through said compartment 6 and is in open communication with the lower chamber 3. The lower portion of said inner stack 7 is, as will be seen upon reference to Figs. 1, 2, and 3, formed of a series of cast-metal plates 8, securely bolted together and provided with outwardly-extending wings or flanges 9, said wings or flanges serving to conduct the heat from the flue into the upper central chamber 6. The air coming into contact with the surfaces of these extended flanges causes a strong draft to pass up through the main stack. To provide a suitable support for said inner flue or stack, columns or uprights 10 are employed, as is clearly shown in the figures just alluded to. Within the lower main chamber 3 there is also formed a central chamber 11, corresponding to the central chamber 6. Suitable doors or valves 12, 13, and 14 afford communication between the main upper chambers 2 and the inner central chamber 6, said doors being connected to upright rods 15, which extend through the roof of the main chamber and carry handles or cranks 16 at their upper ends for operating said doors. These doors may be so manipulated that any one of them or all of them may be closed, as desired. Their operation in the use of the apparatus will be hereinafter described in detail. Similar doors 17, 18, and 19 afford communication between the lower main chamber 3 and the lower central chamber 11, said doors being operated by suitable rods similar to those used for operating the doors or valves above referred to. As will be noted, the two series of doors are slightly offset, so that their operating-rods may pass each other without hindrance.

Walls 20 extend out from the lower chamber 11 into the lower main chamber 3, these walls being, as is clearly shown in Figs. 1 and 2, formed adjacent to the openings which the valves 17, 18, and 19 control. The outer ends of these walls, as will be noted upon reference to said figures, stop short of the outer wall of the main body of the structure, so that while the lower main chamber 3 is divided up, as it were, into a series of sections each of these sections or chambers may, nevertheless, be in free communication with the other. Each of the upper chambers 2 may be placed in direct communication with the chamber 3 immediately below it through doors 21, which, as will be seen upon reference to Figs. 1, 2, and 6, are hinged adjacent to the dividing-walls 22, which serve to define said chambers 2. These doors 21 are manipulated and controlled by chains which pass up through the roof of the body.

In the forward portion of the main body there is provided a furnace, which is employed for a threefold purpose—namely, that of starting the apparatus and drying the initial charge preparatory to burning the same, for disposing of dead animals which cannot be treated successfully in the other portions of the apparatus, and also heating up the central stack to induce a strong draft up through the outer stack. Said furnace is provided with a combustion-grate 23, beneath which is an ash-pit 24, provided with suitable doors 25. Above the grate there is a main chamber 26, provided with suitable doors 27 in the front.

Wall 28, which forms the back of the ash-pit, has secured upon it a perforated metal cap 29, the openings therein being in direct communication with similar openings formed in the wall 28 and communicating with the ash-pit. A grate 29$^a$ is supported intermediate said wall 28 and the central wall of the apparatus. This grate is for the purpose of supporting any animal matter which may be introduced through a manhole formed in the roof of the apparatus, which is shown as sealed by two covers 30 and 31.

As is clearly indicated in Fig. 3, the products of combustion passing from the fire go down through the grate 29$^a$ into a chamber 48 and pass directly into the central chamber 11 through an opening 32, which is controlled by a suitable damper or door 33, or the products of combustion may, as will be seen upon reference to Fig. 1, pass out from said chamber 48 through opening 34 into that portion of the lower chamber 3 adjacent thereto.

To provide for the passage of the products of combustion or heated air from that chamber 2 adjacent to the furnace on the left in Fig. 1 to the lower chamber 3 to the right of the furnace, there is formed a way or by-pass 35, which extends beneath the ash-pit, as is clearly shown in Fig. 3 and also indicated in dotted lines in Figs. 1 and 2.

Extending out from the main body of the apparatus is a series of receiving-trunks into which the garbage to be dried and cremated is placed. These trunks are in direct communication with the chambers 2 and the lower chamber 3. Each of the trunks shown in the drawings, with the exception of that in Fig. 5 and corresponding trunk in Fig. 2, which is a modified form, comprises two longitudinal chambers defined by the upright wall 36. These chambers are again divided horizontally by receiving-pans 37, forming an upper and lower chamber 38 and 39, respectively. The pans, as will be noted upon reference to Fig. 4, are provided with upstanding edges and are inclined from each edge toward the center, where they are provided with perforations 40, over which is placed a rounded hood or cover 41. Said hood or cover is cut away at its lower edges, so that while holding the garbage off of the slots or perforations 40 it still permits the liquid matter to drain from the garbage and to pass down through the openings 40 into suitable pans 42, supported centrally beneath the pans 37 by standards 43. As will be noted upon reference to Figs. 1, 2, and 3, said horizontal pans 37 stop short of the end wall of each trunk. Each of the chambers 38 is provided with suitable covers 44, which are so hinged that when opened they form, as it were, hoppers, as is clearly indicated in Fig. 4. The outer ends of the trunks are closed, as is shown in Fig. 3, and in each of said ends a door 49 is arranged, so that air may be admitted directly into the trunks. In the usual operation of the device these doors 49 remain open. Doors or dampers 45 are pivotally mounted at the inner end of the division-wall 36, so that when desired the lower chambers 39 of the trunks may be cut off from communication with the lower main chamber 3. This position is shown in full lines in Fig. 1 and also at the left-hand portion of Fig. 2. At the outer end of each trunk I provide a suitable damper or deflector 46, which, as shown in Figs. 1 and 2, extends across the width of one of the chambers and is pivoted in line with the pan 37. The door is shown in its elevated position in Figs. 1, 2, and 3 and in its lowermost position in dotted lines in Fig. 3. It of course may occupy any position intermediate the horizontal and vertical positions therein indicated and is manipulated and held by a chain, which passes up through the covers. In the trunk, directly opposite the furnace in Fig. 2 and in the cross-section in Fig. 5, I have shown a modified form wherein instead of employing a division-wall 36, as in the other forms, the supports 47 for the pan form the dividing-wall. They of course must be so constructed that they extend the entire length of the pan or the spaces intermediate the supports must be bricked up or filled in, so as to form a wall. The construction of the pans is similar in all respects to that shown in the other form.

In Fig. 3 I have shown the main stack or flue 5 provided with a suitable hood 50, beneath which is mounted a pan or receptacle 51, which is of equal or greater area than the opening in the top of the hood, said pan being positioned directly in line with the opening in the hood 50. It will also be noted that the main body of the stack extends up into the hood somewhat and forms a gutter or valley intermediate the outer face of the upper portion of the stack and the lower inwardly-inclined wall 52 of said hood. Perforations or openings 53 are formed in said wall 52, and suitable pipes 54 extend through the main stack and communicate with the interior of the pan 51. The openings 53 serve to permit any water which may drive into the stack and not be caught by the pan 51 to pass out. The pipes 54 also serve to lead or direct any water which may accumulate in the pan directly out therefrom. From this construction it will be noted that any water which may pass in through the open end of the hood will either be caught by the pan or be caught by the inclined wall 52 and pass out through the openings 53. The pan is, as shown in said figure, in the form of an inverted cone provided with a bottom 55, just below the inner ends of the tubes 54. Said tubes, aside from forming a means for draining the pan, also serve to support the same.

In countries where heavy rainfalls occur the construction of the hood in the manner just described is a matter of much importance in an apparatus of this kind.

The operation of the apparatus is as follows: Assuming that the parts are in the position indicated in Fig. 1 and that a charge of garbage has been placed in the first trunk to the right of the furnace proper, a fire is started in the furnace, and the heat therefrom, passing down into the chamber 48 and out through the opening 34 into that portion of the chamber 3 adjacent thereto, passes directly into the chamber 39, traverses beneath pan 37 therein, thence across and through the corresponding chamber 39 on the opposite side of the division-wall 36 into the space or chamber 3, and thence around wall 20, directly opposite the furnace, through the opening controlled by damper 18, and up into the central stack. The course of travel is indicated by arrows in Figs. 1 and 3. This may be accomplished by having the products of combustion pass in the course above indicated or by dropping the damper 46 down into the position indicated in dotted lines in Fig. 3, causing the products of combustion to pass under one pan, thence upwardly and back toward the central stack or chamber over both of the pans. If door 49 be opened with damper 46 in its lowered position, then not only will the products of combustion pass up over the matter contained in the pans, but a current of air will likewise be drawn in through door 49 and will pass over said pans with the products of combustion. Inasmuch as the water and other liquid matters contained in the garbage are readily drained therefrom, the air which passes over the top of the charge of garbage will serve to dry the same much more rapidly than would be the case if the liquid were not withdrawn. Moreover, as the liquid is held in the pan or trough 42, which is in direct contact with the products of combustion, said liquid will be very quickly disposed of and driven off. When the charge has become sufficiently dry so that it will burn, the fire in the furnace proper is allowed to subside, or it may be kept up, if so desired, to incinerate carcasses, in which case damper 33 will be turned so that the products of combustion and gases passing from the furnace will pass directly into the central chamber 11 and up through the stack 7. The charge of garbage which has just been dried is then ignited at the outer end of the trunk, the door or damper 21 belonging to said trunk being dropped, so that the products of combustion and the heat emanating from said burning garbage may pass down through the opening controlled by said damper or door and into the chamber 3 adjacent to the trunk next in the series. The products of combustion and the heat will then pass into the chamber 39, beneath the pan 37, and around the end thereof into the opposite or parallel chamber 39 and beneath the pan back toward the stack. The position of the parts when this takes place is indicated in Figs. 2 and 6. It will also be noted upon reference to said Fig. 2 that the third trunk of the series is closed off from the chamber 3 by the doors or dampers 45. Hence said trunk may be charged while the operation of burning and drying is going on in the other trunks. By the time the garbage in the first trunk is burned out the charge in the second trunk will have become sufficiently dry so that it may be ignited. When this condition obtains, the operator closes off the first trunk, opens the third trunk, which has just been charged, and ignites the dry product in the second trunk, opening the doors and dampers in the manner above set forth, so that the products of combustion from the dried matter in the second trunk may pass down into the chamber 3 below and thence back and forth beneath the pans in the third trunk and finally to the stack. When this is taking place, the trunk which was first charged and burned may be recharged and the operation carried on continuously.

It is of course manifest that any number of trunks may be employed. In practice the trunks and furnace are sunk beneath the ground-level, or dirt is piled up against the sides thereof, so that vehicles containing the garbage may be driven up thereto and the material dumped directly onto the pans.

Of course the products of combustion and heat derived from a charge which is burning in one of the trunks may be caused to pass not only under the first trunk in the series adjacent thereto, but may also be caused to traverse beneath it and the succeeding trunks before it finally enters the central stack and passes out.

In the operation of the apparatus the garbage is dried below what may be termed a "scorching" temperature, or a temperature which would serve to burn the garbage, and it is not so much the high degree of heat employed that is relied upon to do the drying as the great volume of warm air which is drawn in above the charges and also passes beneath the pans in which the charge is held. The burning of the garbage from the top and the introduction of a large volume of air directly thereto while the same is burning serves to prevent the smoke which would otherwise be present were the garbage burned from the bottom and without a sufficient quantity of air.

By placing what may be termed a "combustible filter" upon the pans—namely, a bed of straw, brush, manure, or the like—the apparatus may be used for the disposition of semiliquid garbage and also night-soil. The filter acts as an open support for the material and permits the liquid to drain therefrom, and after having been slightly dried the filter-bed itself may be ignited and burned, together with the material resting thereon. This is an important factor in the apparatus, as it enables it to dispose of substances heretofore found impossible of treatment, so far as I am aware, in a garbage-crematory apparatus.

By manipulating the damper or deflector 46, assuming, of course, that the door 49 is closed down, the heated air and products of combustion, which pass beneath the pans, may be deflected directly up, over, and above the charge contained in the companion pan, or with the construction shown in Fig. 5 and the corresponding part of Fig. 2 they may be deflected out of the chamber 39 up over the pan, instead of passing back upon the other side of the division-wall formed beneath the pan.

The various parts of the apparatus being duplicates throughout, it is of course manifest that it may be easily repaired and any broken part replaced with but little delay and expense.

The pans are made up in sectional form to afford ease of handling and facility in cleaning out when necessary.

The invention is susceptible of various modifications, and I do not therefore desire to limit myself to the precise details of construction as herein set forth.

Having thus described my invention, what I claim is—

1. In a crematory-furnace, the combination of a main central chamber; a series of trunks extending therefrom and in communication therewith, each trunk comprising an upper and a lower section; and means for controlling the communications between said trunk-sections and the central chamber, for placing any one of the trunks in communication with the main body and with each other in series through said chamber, substantially as described.

2. In a crematory-furnace, the combination of a central chamber; a series of trunks extending therefrom; means contained within said trunks for holding the material to be cremated, said means dividing the trunks into an upper and lower compartment; and connections between said chamber and the compartments of the trunks, for causing the products passing from the material contained in one of the trunks to be deflected into the main body and thence beneath the charge in any one of the other trunks, substantially as described.

3. In a crematory-furnace, the combination of a main body provided with a series of chambers in its upper part, and a chamber beneath said series in the lower portion thereof; a flue in communication with the upper series; a second flue in communication with said lower chamber; a series of trunks extending from said main body; means contained within said trunks for holding a charge of material to be treated, the upper portion of said trunk above the means being in direct communication with the upper series of chambers within the main body; and means for controlling communication between the lower chamber in the main body and the space within the trunk beneath the charge-receiving means.

4. In a crematory-furnace, the combination of a main body; a furnace therein; a series of chambers 2 formed in the upper part of said body; a chamber 3 formed in the base of said body; means for controlling the communication between said furnace and the chamber 3; a series of trunks extending from said body; means contained within said trunks for dividing the same horizontally into an upper and lower chamber, said upper chambers being in direct communication with the chambers 2; and means for controlling the communication between said lower chambers in said trunks and the chamber 3, substantially as described.

5. In a crematory-furnace, the combination of a main body provided with a series of chambers 2 formed in the upper portion thereof; a stack; dampers controlling communication between said chambers and the stack; a chamber 3 located in the bottom of said body; a second stack or flue; dampers for controlling communication between said second stack and the chamber 3; a furnace; a way or channel extending from said furnace to said second stack and the chamber 3; means for controlling the opening leading from said way or channel to the second stack; a series of trunks extending from said body; charge-receiving receptacles extending lengthwise of said trunks, and dividing them into an upper and lower chamber; doors or dampers controlling the communication between said lower chamber and the chamber 3; and doors or dampers affording communication between said chambers 2 and the lower chamber 3, substantially as and for the purpose described.

6. In a crematory-furnace, the combination of a main chamber; a series of trunks extending therefrom, each trunk being divided into an upper and lower compartment; connections or passages between said main chamber and the compartments of the trunks; and means for controlling the opening of said passages whereby the garbage or other material which has been previously dried within the upper compartment of one of said trunks may be burned and the products of combustion emanating therefrom caused to pass through the main chamber, to and beneath the charge within another one of the series of trunks.

7. In a crematory-furnace, the combination of a main body; a furnace located therein; a series of trunks extending from the main body; openings or passages between said body, furnace and trunks; and means for controlling said openings or passages, whereby the charge contained within the first trunk may be dried by the fire from the furnace, and the products of combustion emanating from the burning of said dry charge in the first trunk caused to pass beneath the charge within the second trunk, and to dry the same, substantially as described.

8. In a crematory-furnace, the combination of a main body; a furnace therein; a series of chambers 2 formed in the upper portion of said body; a stack; dampers or valves controlling communication between said stack and the chambers 2; a chamber 3 formed in the body and beneath said chambers 2; a second stack; a valve controlling communication between said chamber 3 and the said second stack; a duct or chamber leading from the furnace to said second stack and the chamber 3; means for controlling communication between said duct and said stack and chamber 3; a series of trunks extending from the main body; pans mounted within said trunks, intermediate a division-wall 36; and means for conducting the products of combustion emanating from a burning charge of material within one of said trunks to and below one of the pans in the adjacent trunk, thence beneath the other pan in said trunk and finally into said second stack.

9. In a crematory-furnace, the combination of a main body; a series of chambers 2 formed therein; a stack; means for controlling communication between said chambers and the stack; a chamber 3 formed below said chambers 2; an inner stack; means for controlling communication between said chamber 3 and said inner stack; means for controlling communication between said chambers 2 and the chamber 3; a furnace; a duct or way leading from said furnace into the chamber 3; a series of trunks extending from the body; a division-wall extending longitudinally of said trunks; pans mounted within said trunks, intermediate the division and outer walls thereof; and means for controlling communication between the space beneath the pans in said trunks and chamber 3.

10. In a crematory-furnace, the combination of a central stack or flue; a second stack mounted therein; a series of trunks extending out from said stacks; means contained within said trunks for supporting a charge of material to be treated; valved openings extending from the upper portions of said trunks to the central stack; and means substantially as described for controlling the flow of the products of combustion from one of the charges when burned to and beneath the other charge and up through said second stack, substantially as described.

11. In a crematory-furnace, the combination of a main chamber; a series of trunks extending therefrom, each trunk comprising an upper and a lower compartment; openings or passages between the compartments of said trunks and the main chamber; means for controlling said openings or passages whereby a charge in the upper compartment of one of said trunks may be burned and the products of combustion caused to pass beneath a charge in any one of the other trunks of the series; and a furnace for drying the charge in the first of said trunks.

12. In an apparatus for treating garbage, the combination of a main body; a series of trunks extending therefrom; pans 37 mounted within said trunks; a trough 42 mounted beneath openings formed in said pans 37; a suitable support for said trough; and covers for the openings in the pans, substantially as described.

In witness whereof I hereunto set my hand in the presence of two witnesses.

FRED P. SMITH.

Witnesses:
 HORACE A. DODGE,
 THOMAS LLOYD JENKINS.